May 17, 1960 L. J. LAUCK 2,936,978
REAR ENGINE MOUNT
Filed March 29, 1957 2 Sheets-Sheet 1
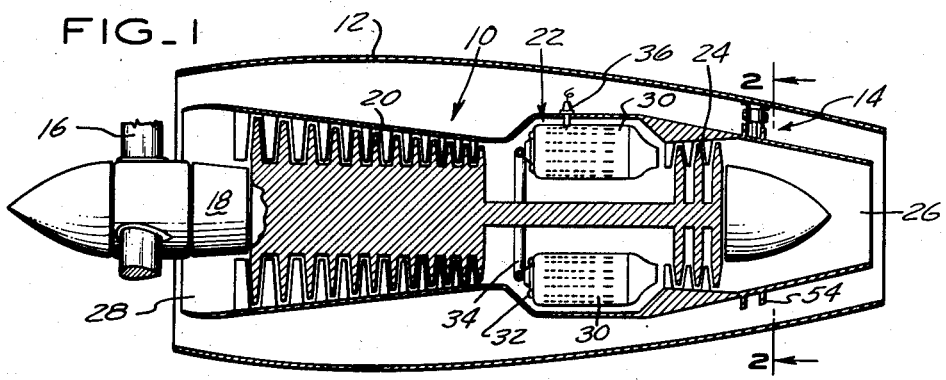
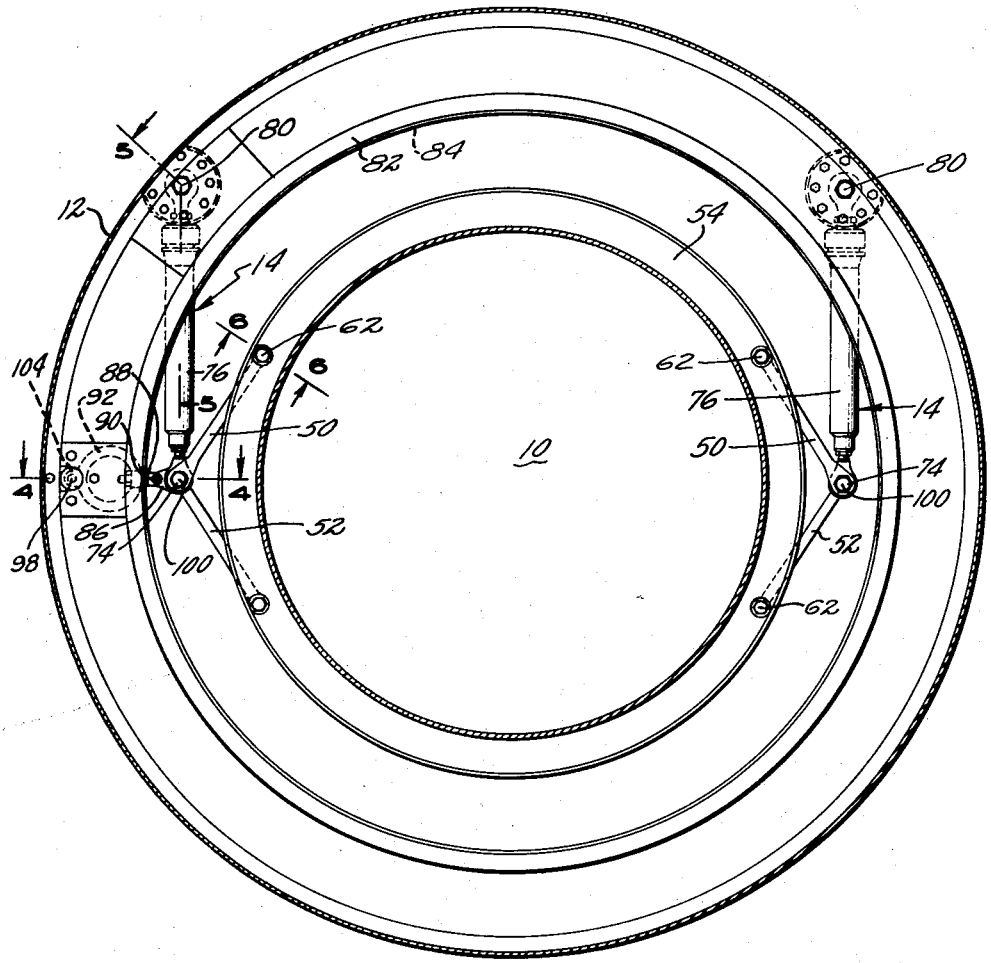
INVENTOR
LAWRENCE J. LAUCK
BY Vernon F. Hauschild
ATTORNEY May 17, 1960
L. J. LAUCK
2,936,978
REAR ENGINE MOUNT
Filed March 29, 1957
2 Sheets-Sheet 2
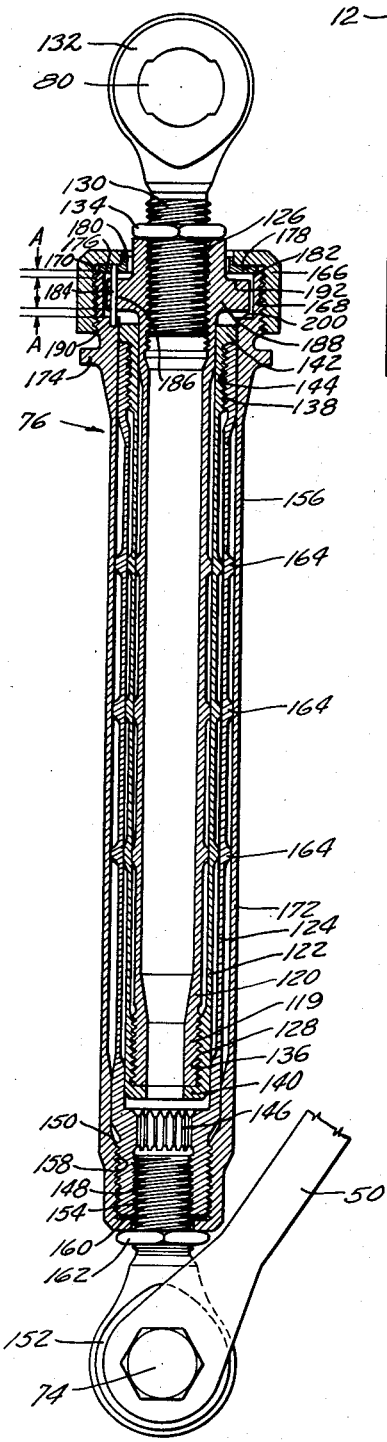
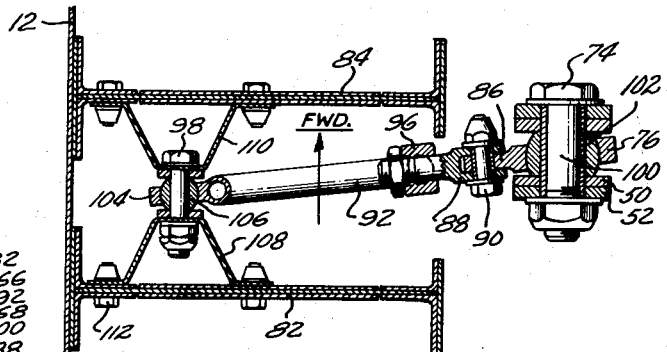
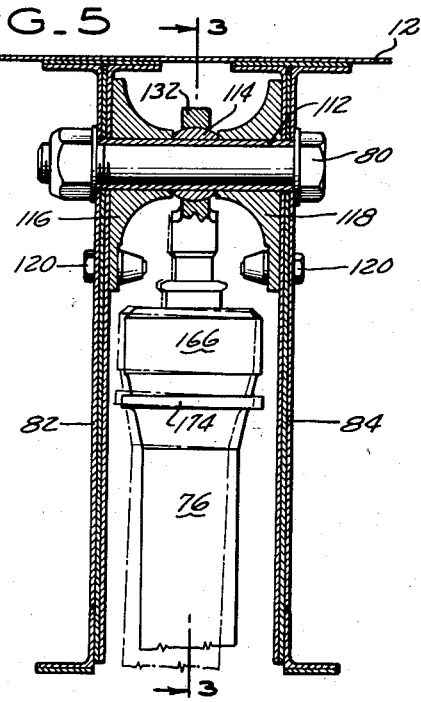
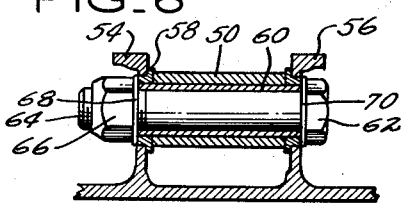
INVENTOR
LAWRENCE J. LAUCK
BY *Vernon F. Hauschild*
ATTORNEY

United States Patent Office 2,936,978
Patented May 17, 1960

2,936,978

REAR ENGINE MOUNT

Lawrence J. Lauck, East Hartford, Conn., assignor to United Aircraft Corporation, East Hartford, Conn., a corporation of Delaware Application March 29, 1957, Serial No. 649,473

11 Claims. (Cl. 248—5)

This invention relates to mounting means and more particularly to the mounting of an aircraft engine within an airplane nacelle.

It is an object of this invention to provide mounting means at the rear of an aircraft engine, for example a turboprop engine, which is capable of withstanding all of the engine torque load, a portion of the engine side load and a portion of the engine vertical load and adapted for use with a front engine mount, which front engine mount is capable of withstanding all of the engine thrust load.

It is a further object of this invention to provide a rear engine mount which is capable of operating at elevated ambient temperatures and in which all or all important material parts are or may be made of metal.

It is a further object of this invention to provide rear engine mounting means in which the engine torque and vertical loads are carried by a plurality of flexible concentric tubes during normal operation, which flexible tubes perform the additional function of isolating engine vibrations from the airplane, and in which a highly rigid and strong mounting member is utilized together with the flexible tubes to carry engine loads during the periods of high load operation.

It is a further object of this invention to provide a flexible ring or torus, preferably of metal, to withstand engine side loads.

It is a further object of this invention to provide rear engine mounting means which is light and compact in construction and inexpensive to manufacture.

Other objects and advantages will be apparent from the following specification and claims, and from the accompanying drawings which illustrate one embodiment of my invention.

In these drawings:

Fig. 1 is a cross sectional showing of a modern airplane turboprop engine of the type which will utilize my rear engine mounting means;

Fig. 2 is a cross sectional view taken through line 2—2 of Fig. 1;

Fig. 3 is a cross sectional view taken through line 3—3 of Fig. 5;

Fig. 4 is a view taken along line 4—4 of Fig. 2;

Fig. 5 is a view taken along line 5—5 of Fig. 2; and

Fig. 6 is a view taken along line 6—6 of Fig. 2.

Referring to Fig. 1, we see a modern airplane turboprop engine 10 located within engine nacelle 12 and supported therein by my rear engine mount system 14 and a front engine mount (not shown), which is designed to take the entire thrust load of engine 10 such as the mount disclosed and claimed in United States Patent No. 2,753,140. Engine 10 comprises propeller 16, reduction gear 18, compressor section 20, combustion section 22, turbine section 24 and exhaust outlet 26. Air enters compressor section 20 through air inlet section 28 and is compressed as it passes therethrough. The compressed air then enters combustion section 22 and is heated within combustion chambers 30. Fuel is supplied to combustion chambers 30 through a plurality of fuel nozzles 32 which are located on combustion chambers 30 and which spray atomized fuel into the combustion chamber interior. Fuel is supplied to fuel nozzle 32 by fuel manifold 34. Ignition means 36, such as a spark plug is used to ignite the mixture of atomized fuel sprayed into combustion chamber 30 by fuel nozzles 32 and air from the compressor. The heated gases then pass through turbine section 24 and are discharged in a thrust generating function through exhaust outlet 26. Engine 10 provides motive power to the airplane in which it is to be used both by the thrust generated by passing the exhaust gas to atmosphere through exhaust outlet 26 and also through the well known rotary action of propeller 16. Reduction gear 18 is provided between compressor 20 and propeller 16 to provide a speed reduction therebetween. A thrust load is impoesd upon engine 10 mainly by the fact that the pressure progressively rises through compressor 20 and, therefore, the pressure acting against the downstream side of all objects is greater than the pressure acting upon the upstream side of all objects, thereby imposing a forwardly directed thrust load. A torque load is imposed mainly in reaction to the rotation of propeller 16. Vertical loading is brought about by the weight of engine 10, airplane maneuvering loading, and gyroscopic moments of engine rotating parts while side loading is brought about by attempting relative movement between engine 10 and the airplane containing nacelle 12 in a sidewise direction due to maneuvering and gyroscopic loading. It should be noted that the torque imposed upon engine 10 in reaction to propeller 16 is imposed in the same direction whether propeller 16 is in normal thrust operation or in reverse thrust operation, since the direction of rotation of propeller 16 is the same in both circumstances. The direction of torque loading on engine 10 is in the opposite direction only when a negative torque is being imposed upon the engine and this occurs when propeller 16 is driving engine 10 windmilling instead of the engine driving the propeller as in normal operation.

My invention relates to the rear engine mount system 14 only and is shown generally in Fig. 2. Fig. 2 shows engine 10 located within airplane nacelle 12 and supported therein by my rear engine mount system 14. Mounting system 14 comprises a pair of link bars 50 and 52 which are located on opposite sides (so called left-hand and right-hand) of engine 10 and substantially in the three o'clock and nine o'clock positions as illustrated. At one of their ends each link bar is pivotally attached to the outer periphery of engine 10, as it meets the engine periphery tangentially, since it extends between axially spaced flanges 54 and 56 (Fig. 6) which extend radially outward from engine 10 and may be a part of the engine case or the turbine case. This connection is best shown in Fig. 6 in which the link bar end of 50 is shown to be substantially cylindrical and passing axially between flanges 54 and 56. Bushings, spacers or washers such as 58 may be used at one or both ends of link bar 50 to more accurately position link bar 50 and to withstand the friction wearing as the link bar 50 pivots with respect to flanges 54 and 56. Cylindrical spacing sleeve 60 extends between flanges 54 and 56 and passes concentrically within the cylinder end of link bar 50 and in return receives and performs a spacing function for connecting means 62. Connecting means 62 comprises bolt 64 which is concentric within and passes through both sleeve 60 and the cylindrical end of link bar 50 and has threads at one of its ends which engage the cooperating threads of nut 66. To avoid friction wear between the moving parts, washers such as 68 and 70 may be used. In this fashion one end of each link bearing is pivotally attached to the outer periphery of engine case 10 and extends tangentially therefrom. The ends of each link bar such as 50 and 52 are bifurcated and each has holes passing therethrough which are capable of aligning such that a connecting means such as nut and bolt unit 74 may pass therebetween to pivotally attach link bars 50 and 52 together at their bifurcated ends. Connecting means 74 further pivotally engage vertically extending main shock struts 76 at the lower end of main shock struts 76 while the upper ends of struts 76 are pivotally attached by connecting means 80 to the engine nacelle 12 and more particularly to the axially spaced radially inwardly directed bulkheads 82 and 84 of nacelle 12. The construction of and connections for main shock struts 76 will be described in greater detail later. One of the main shock struts 76 has ear 86 projecting therefrom. Bifurcated connecting means 88 is pivotally attached to ear 86 by connecting means 90 which passes through aligned holes in ear 86 and connecting means 88 and is further attached at its opposite end to substantially laterally projecting flexible ring or torus 92 by outer diameter threads which engage inner diameter threads of torus 92 as shown in Figs. 2 and 4. Torus 92 is preferably a metal ring of a fixed spring rate to withstand the side loading of engine 10 and it might be found necessary to locally thicken torus 92 at 96, such that the inner diameter threads of torus 92 will be located in sufficiently thick metal to prevent thread tearout or other failure. Torus 92 is pivotally attached by connecting means 98 to nacelle bulkheads or flanges 82 and 84.

In short, Fig. 2 shows 2 link bar pairs comprising link bars 50 and 52 pivotally engaging the outer periphery of engine 10 tangentially and pivotally engaging one another at a second pivot point 100 and further shows vertically extending main shock struts 76 engaging said link bar pairs pivotally at said second pivot points and further pivotally engaging engine nacelle. Main shock struts 76, in association with the link bar pairs withstand a portion of the engine vertical load and withstand the full torque load on engine 10. Obviously, the engine vertical loading places both struts 76 in tension but the engine torque loading places one in tension and the other in compression. Fig. 2 further shows torus 92 pivotally engaging one strut 76 and one link bar pair substantially at pivot point 100 and also pivotally engaging engine nacelle 12. Torus 92 performs the function of absorbing a portion of engine side load.

Figure 4 shows in greater detail the double pivotal connections on opposite sides of torus 92. The right hand side of Fig. 4 shows the pivotal connection at pivot point 100 between the bifurcated ends of link bars 50 and 52 and the lower end of vertically extending main shock strut 76, all of which are pivotally connected one to the other by connecting means 74. Ball 102 is sleeved over connecting means 74 between the bifurcated arms of the inner ring bar 50 so as to engage the bottom or lower end of main shock strut 76 in ball joint fashion so as to effect a universal motion between main shock strut 76 and link bars 50 and 52. Ear 86 is shown to project from the lower end of the main shock strut 76 which is to engage torus 92 and is received between the arms of bifurcated connecting means 88 and pivotally connected thereto by connecting means 90 which may be of the familiar nut and bolt construction. The opposite end of connecting means 88 is threaded to be received in cooperating threads on one side of torus 92. Torus 92 has ear 104 projecting therefrom and which is shaped to be received by ball 106 of pivotal connecting means 98 such that torus 92 is pivotally attached and further capable of universal motion in its connection to engine bulkheads 84 and 82 of nacelle 12 as well as in its connection to engine 10 through link bars 50 and 52 and strut 76, as described above. Connecting means 98 may be of the familiar nut and bolt variety as shown. Conical support units 108 and 110 are attached to nacelle bulkheads 82 and 84 by attachment means 112 and converge toward one another to support connecting means 98 and position and space same between nacelle bulkheads 82 and 84.

It will be noted, as illustrated in Fig. 4, that the installation of rear mount 14 is made such that torus 92 is in an angular relationship to engine 10, as opposed to a radial relationship. This angular variation is purposely made such that torus 92 will project substantially radially during normal operation when engine 10 reaches its operating temperature and expands aft.

Fig. 5 shows the pivotal connection between the upper end of main shock strut 76 and engine nacelle 12. Connecting means 80 which may be of the familiar nut and bolt variety projects between nacelle bulkheads 82 and 84. Sleeve 112 is sleeved onto connecting means 80 to provide spacing means and prevent pinch of bulkheads 82 and 84. Ball 114 is carried concentrically about sleeve 112 and engages the upper end of strut 76 in ball joint fashion such that a universal action may be accomplished between strut 76 and engine nacelle 12, thereby giving struct 76 a universal connection at both of its ends. Spacers or support means 116 and 118 are attached to nacelle bulkheads 82 and 84 by connecting means 120 and project toward one another to engage ball 114 and to provide a spacing and support function therefor.

The details of the main shock strut 76 are shown in detail in Fig. 3. Both main shock struts are identical in detail excepting that the one which pivotally engages torus 92 has a connecting adaptation for this purpose, otherwise, the shocks are interchangeable. The struts 76 comprise a plurality of flexible or resilient tubes 119 including substantially coextensive, concentric, flexible and resilient tubes 120, 122 and 124 which are preferably made of a metal such as titanium which has a low modulus of elasticity relative to steel to accomplish a "spring" effect not only to withstand loading during normal operation but also to isolate or dampen engine vibrations so that they are not imparted to the plane where they would be objectionable to passenger comfort. While three such flexible tubes are illustrated in Fig. 3, it should be borne in mind that depending on the desired spring rate, any number of flexible tubes of varied length could be chosen. The material titanium was chosen in preference to steel because shorter tubes were needed to give the desired spring rate. Flexible or resilient tubes 120, 122 and 124 have their alternate ends joined as hereinafter described. Inner tube 120 has inner diameter or internal threads 126 at its upper end and outer diameter or external threads 128 at its lower end. The purpose of the inner diameter or internal threads 126 is to engage the outer diameter threads 130 of upper connecting means 132 of strut 76. Upper connecting means is shaped roughly as an eye bolt and pivotally and universally attaches the upper end of strut 76 to engine nacelle 12. When upper connecting means 132 is in proper position with respect to inner tube 120, lock nut 134 is tightened against the inner tube 120 to lock attachment means 132 in place. If desired, locking wire may be used to lock nut 134 in position relative to inner tube 120. Intermediate tube 122 has inner diameter or internal threads 136 at its lower end which engage outer diameter or external threads 128 of inner tube 120 and further has outer diameter or external threads 138 at its upper end. Lip 140 projects from intermediate tube 122 to abut the lower end of inner tube 120 to position one relative to the other. It will be noted that lip 142 projects outwardly from the opposite end of intermediate tube 122. Outer tube 124 has inner diameter or internal threads 144 at its upper end which engage outer diameter or external threads 138 of intermediate tube 122 as outer tube 124 abuts projection or lip 142 of intermediate tube 122 to position outer tube 124 with respect to intermediate tube 122. At its bottom end outer tube 124 necks inwardly to present inner diameter or internal spline 146 and inner diameter or internal threads 148 as well as outer diameter or external threads 150. The purpose of spline 146 is to hold outer tube 124 in position while the other tubes 120 or 122 are screwed into or out of position during assembly or disassembly. Bottom connecting means 152, which is also substantially of eye bolt construction, has outer diameter or external threads 154 which mate with inner diameter or internal threads 148 of outer tube 124 to attach these parts together.

An outer rigid metal cylinder unit 156, preferably made of steel, envelops the plurality of flexible tubes 119 and performs a function of working in unison with the inner tube plurality 119 to carry engine loads when the loads exceed normal engine operating loads. At its bottom end inner diameter or internal threads 158 of outer cylinder unit 156 engage outer diameter external threads 150 of outer tube 124 to position outer cylinder 156 with respect to the inner tube plurality 119. Spacer 160 is placed between outer tube 124 and outer cylinder unit 156 and performs a relative spacing function to be described hereinafter. Lock nut 162 performs the function of positioning and locking lower connecting means 152 with respect to outer case 156 and the plurality of flexible tubes 119. It will be noted that lips such as 164 project from flexible tubes 120, 122 and 124 to assist in maintaining concentricity between these flexible tubes 120, 122 and 124, and between the plurality of flexible tubes 119 and the outer cylinder 156 and also prevent buckling of the tubes which are in compression. Cap 166 has inner diameter or internal threads 168 which engage with the bottom portion of outer cylinder unit 156 so as to make the entire outer cylinder envelope unit 156 therebetween. If desired, locking wire may be used to lock cap 166 in position relative to outwardly directed projection 174 of outer cylinder lower portion 172 so as to lock the two parts in proper relative position as they co-act to form the entire outer cylinder 156. Locking plate 176 engages surface 178 and 180 of cap 166 and the notch in top edge of unit 156 and is held in position against surface 180 by the fit between the two parts and against surface 178 by the force of outer cylinder lower portion 172 which bears against the surface 182 of locking ring 176. Locking ring 176 carries a single dowel 184 which projects therefrom and is received in one of 30 holes 186 of flange 188 of inner tube 120 and also in one of three holes 190 of outer cylinder 156, after tube 120 has received its installed torque. Locking ring 176 and dowel 184 perform the function of preventing relative rotation between outer cylinder 156 and the plurality of inner tubes 119.

Gap A which is shown in Fig. 3 to exist between the plurality of inner tubes 119 and the outer cylinder or case 156 and which extends in a vertical direction, as shown, is of critical importance. The purpose of spacer 160 is to position the plurality of inner tubes 119 with respect to the outer cylinder 156 such that gap A is held to a very exact dimension. Gap A is important since, during normal loading it permits the plurality of flexible tubes 119 to operate and perform the load carrying and vibration isolation or damping functions of strut 76 without the assistance or without respect to outer rigid cylinder 156. This is desirable since the flexible tube plurality 119 is capable of carrying normal operating engine loads and is so constructed structurewise and made of a metal with low modulus of elasticity that the vibration isolating and damping function along with the desired spring rate through the tensile and compressive properties of the metal can be accomplished. It will be noted that by joining tubes 120, 122 and 124 such that the intermediate tubes have inner connecting means at one of their ends and outer connecting means at their other end which engage opposite connecting means with the adjacent tubes and eventually engage the inner and outer tubes such that an inner connecting means is always engaging an outer connecting means of the adjacent tube, the result gained thereby is that we gain the flexibility of a tube whose length is equal to the sum of the lengths of all flexible tubes in tube plurality 119. As shown, this desired spring rate or degree of flexibility is accomplished in the minimum of space.

In addition to permitting inner flexible tube plurality 119 to function independent of rigid outer cylinder 156 during engine operation at normal operating loads, the dimensions of gap A are chosen such that it is completely closed at maximum working loads due to the extension of the tube plurality 119 such that surface 192 of inner tube 120 and hence inner tube plurality 119 engages surface 182 of spacer ring 176 or surface 200 of upper end of outer unit 156, therefore, rigid outer tube 156 at a preselected engine loading such that when engine loading exceeds this preselected value, rigid outer tube 156 works in unison with flexible tube plurality 119 to carry the engine overload thereafter. It will be noted by examining Fig. 3 that if the loading on strut 76 is tension loading, then, inner tube 120 is in tension, intermediate tube 122 is in compression and outer tube 124 is in intension. This alternate loading stress of the associated tubes would continue to exist if we went to a greater number of intermediate tubes. It will further be noted that when the overall loading on strut 76 is in compression, exactly the reverse loading occurs on the flexible tubes such that tubes 120 and 124 are now in compression while tube 122 is in tension.

To assemble strut 76, spacer 160, ground to proper height, is placed in outer case 156. Outer tube 124 is then threaded into outer case 156 until it abuts spacer 160 and required torque is applied. Intermediate tube 122 is then threaded into outer tube 124 until lip 142 of intermediate tube 122 abuts the tube end of outer tube 124 and required torque is applied. Inner tube 120 then is threaded into intermediate tube 122 until the lower end of inner tube 120 abuts lip 140 of intermediate tube 122 and required torque is applied. Lock ring unit 176 is then installed such that it passes through holes 186 and 190 and engages the tube plurality 119 or tube 120 and the lower portion 172 of outer casing 156. Cap 166 is then threaded onto lower portion 172 to form rigid outer cylinder 156 therewith until it abuts against lock ring unit 176. Bottom connecting means 152 is then threaded onto outer tube 124 and locked in place by a lock nut 162. Top connecting means 132 is then threaded into inner tube 120 and locked in position by lock nut 134 such that the distance between the centers of top and bottom connecting means 132 and 152 is of an exact dimension to position the engine in the nacelle.

To disassemble strut 76, first remove ball ends or ball rod ends items 132 and 152, then remove cap 166 of outer cylinder 156 and lock ring 176. Outer cylinder 156 is then unthreaded from outer tube 124 by use of wrenching spline 146 and wrench flats on lower outer portion of 156. Spacer 160 will now drop out of 156. Using the same wrenching spline 146, tubes 120 and 122 are unthreaded in the same order.

It should be noted that a given strut 76, such as is shown in Fig. 3, can be used as either the left or the right-hand strut as viewed in Fig. 2 and that connecting means 152 and 132 can be used as either the top or bottom connecting means. The only limitation is that some means must be provided to pivotally attach the bottom end of one of the main struts 76 to torus 92.

To avoid repetition in the description of this rear engine mount system, each part of the mounting system is not described as being preferably made of metal but it should be borne in mind that it is an important feature of this invention that the mount design is such that all parts may be made of metal. This is not to say that it would be impossible to make an effective mounting system of the type taught herein utilizing a non-metallic part or even fabricating one of the parts of my mount from non-metallic material. The important point is, that in this day of high temperature engine operation in which engine mounts are being subjected to severe temperatures, it is an important consideration to be able to obtain the advantage of the temperature resistance acquired by using metal parts.

It is to be understood that the invention is not limited to the specific embodiment herein illustrated and described, but may be used in other ways without departure from its spirit as defined by the following claims.

I claim:

1. An all-metal engine rear support system for supporting an engine within an outer housing comprising pairs of link bars adapted to be located on opposite sides of an engine and with each of said link bars adapted to be pivotally attached at one end to the engine and with its other end pivotally attached at a second pivot point to the other link bar in its pair, and vertically extending main shock struts comprising a plurality of coextensive, concentric tubes having their alternate ends joined and which struts are adapted to be pivotally attached to the outer housing and each pivotally attached to one of said pairs of link bars at said second pivot point.

2. An engine rear support system for supporting an engine within an outer housing comprising pairs of link bars for location on opposite sides of the engine and with each of said link bars adapted to be pivotally attached at one end to the engine and with its other end pivotally attached at a second pivot point to the other link bar in its pair, a substantially laterally projecting flexible ring adapted to be pivotally attached to the outer housing and to one of said pairs of link bars at said second pivot point, and vertically extending main shock struts adapted to be pivotally attached to said outer housing and each pivotally attached to one of said pairs of link bars at said second pivot point.

3. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting flexible ring adapted to be pivotally attached to the outer housing and to one of said pairs of link bars at said second pivot point, and vertically extending main shock struts adapted to be pivotally attached to said outer housing and each pivotally attached to one of said pairs of link bars at its said second pivot point, each of said struts comprising a plurality of concentric resilient tubes, means joining said tubes so that the effect of a flexible tube equal in length to the sum of the lengths of all tubes in said plurality is accomplished.

4. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting ring adapted to be universally pivotally attached to the outer housing and to one of said pairs of link bars at said second pivot point, and vertically extending main shock struts adapted to be universally pivotally attached to said outer housing and each universally pivotally attached to one of said pairs of link bars at said second pivot point, each of said struts comprising a plurality of concentric resilient tubes including an inner tube having external connecting means at its bottom end, an outer tube having internal connecting means at its upper end, at least one intermediate tube with external connecting means at one end and internal connecting means at its other end with the external connecting means engaging internal connecting means of an adjacent tube while the internal connecting means engages external connecting means of the other adjacent tube such that said intermediate tube or tubes connect said inner tube to said outer tube to accomplish the effect of a single flexible tube of a length equal to the total length of all of said tubes.

5. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting flexible ring adapted to be pivotally attached to the outer housing and to one of said pairs of link bars at said second pivot point, two vertically extending main shock struts each comprising a plurality of concentric resilient tubes, means joining said tubes so that the effect of a flexible tube equal in length to the sum of the lengths of all tubes in said plurality is accomplished and with the inner tube and the outer tube presenting connecting means, means engaging said inner tube connecting means and adapted to pivotally attach said vertical struts to the outer housing at their upper ends and means engaging said outer tube connecting means to pivotably attach the other ends of said vertical struts to said link bar pairs at said second pivot points.

6. An all-metal engine rear support system for supporting an engine within an outer housing comprising pairs of link bars adapted to be located on opposite sides of the engine and with each of said link bars adapted to be pivotally attached at one end to the engine and with its other end pivotally attached at a second pivot point to the other link bar in its pair, a substantially laterally projecting flexible ring adapted to be pivotally attached to the outer housing and to one of said pairs of link bars at said second pivot point, two vertically extending main shock struts each comprising a plurality of concentric resilient tubes including an inner tube having external connecting means at its bottom end and connecting means at its upper end, an outer tube having internal connecting means at its upper end and connecting means at its lower end, at least one intermediate tube with external connecting means at one end and internal connecting means at its other end with the external connecting means engaging internal connecting means of an adjacent tube while the internal connecting means engages external connecting means of the other adjacent tube such that said intermediate tube or tubes connect said inner tube to said outer tube to accomplish the effect of a single flexible tube of a length equal to the total length of all of said tubes, means engaging said inner tube connecting means and adapted to pivotally attach the top of said vertical struts to said outer housing, and means engaging said outer tube connecting means to pivotally attach the lower ends of said vertical struts to said link bar pairs at said second pivot points.

7. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting flexible ring adapted to be pivotally attached to the outer housing and to one of said pairs of link bars at its said second pivot point, vertically extending main shock struts adapted to be pivotally attached to said outer housing and each pivotally attached to one of said pairs of link bars at said second pivot point, each of said struts comprising a plurality of concentric resilient tubes, means joining said tubes so that the effect of a flexible tube equal in length to the sum of the lengths of all tubes in said plurality is accomplished, and a rigid cylinder enveloping said plurality of concentric resilient tubes with a predetermined vertical clearance therebetween such that said resilient tubes perform the engine supporting function and an engine vibration isolating function at normal operating loads while said resilient tubes and said rigid cylinder act as a unit when said clearance is closed by abnormal loads to jointly perform the engine supporting function.

8. An all-metal engine rear support system for supporting an engine within an outer housing comprising pairs of link bars adapted to be located on opposite sides of the engine and with each of said link bars pivotally attached to the engine at one end and with its other end pivotally attached at a second pivot point to the other link bar in its pair, a substantially laterally projecting flexible ring adapted to be pivotally attached to the outer housing and to one of said pairs of link bars at said second pivot point, vertically extending main shock struts adapted to be pivotally attached to said outer housing and each pivotally attached to one of said pairs of link bars at said second pivot point, each of said struts comprising a plurality of concentric resilient tubes including an inner tube having external connecting means at its bottom end, an outer tube having internal connecting means at its upper end, at least one intermediate tube with external connecting means at one end and internal connecting means at its other end with the external connecting means engaging internal connecting means of an adjacent tube while the internal connecting means engages external connecting means of the other adjacent tube such that said intermediate tube or tubes connect said inner tube to said outer tube to accomplish the effect of a single flexible tube of a length equal to the total length of all of said tubes, and a rigid cylinder enveloping said plurality of concentric resilient tubes with a predetermined vertical clearance therebetween such that said resilient tubes perform the engine supporting function at normal loads while said resilient tubes and said rigid cylinder act as a unit when said clearance is closed by abnormal loads to jointly perform the engine supporting function.

9. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting flexible ring adapted to be pivotally attached to the outer housing and to one of said pairs of link bars at said second pivot point such that said engine may move with respect to the outer housing, vertically extending main shock struts adapted to be pivotally attached to said outer housing and each pivotally attached to one of said pairs of link bars at said second pivot point, each of said struts comprising a plurality of concentric resilient tubes including an inner tube having external connecting means at its bottom end, an outer tube having internal connecting means at its upper end, at least one intermediate tube with external connecting means at one end and internal connecting means at its other end with the external connecting means engaging internal connecting means of an adjacent tube while the internal connecting means engages external connecting means of the other adjacent tube such that said intermediate tube or tubes connect said inner tube to said outer tube to accomplish the effect of a single resilient tube of a length equal to the total length of all of said tubes, means attached to said resilient tubes to position said resilient tubes with respect to one another, a rigid cylinder enveloping said plurality of concentric resilient tubes with a predetermined vertical clearance therebetween such that said resilient tubes perform the engine supporting function at normal operating loads while said resilient tubes and said rigid cylinder act as a unit when said clearance is closed by abnormal loads to jointly perform the engine supporting function during overload, and means to adjust said vertical clearance.

10. An all-metal engine rear support system for supporting an engine within an outer housing comprising pairs of link bars adapted to be located on opposite sides of the engine and with each of said link bars adapted to be pivotally attached to the engine at one end and with its other end pivotally attached at a second pivot point to the other link bar in its pair, a substantially laterally projecting flexible ring adapted to be pivotally attached to the outer housing and to one of said pairs of link bars at said second pivot point, vertically extending main shock struts adapted to be pivotally attached to said outer housing and each pivotally attached to one of said pairs of link bars at said second pivot point, each of said struts comprising a plurality of concentric resilient tubes including an inner tube having external connecting means at its bottom end, an outer tube having internal connecting means at its upper end, at least one intermediate tube with external connecting means at one end and internal connecting means at its other end with the external connecting means engaging internal connecting means of an adjacent tube while the internal connecting means engages external connecting means of the other adjacent tube such that said intermediate tube or tubes connect said inner tube to said outer tube to accomplish the effect of a single resilient tube of a length equal to the total length of all of said tubes, a rigid cylinder enveloping said plurality of concentric resilient tubes with a predetermined vertical clearance therebetween such that said resilient tubes perform the engine supporting function at normal loads while said resilient tubes and said rigid cylinder act as a unit when said clearance is closed by abnormal loads to jointly perform the engine supporting function, means connecting said rigid cylinder and said plurality of resilient tubes to prevent rotation therebetween, and engageable means projecting from said outer resilient tube to prevent rotation thereof during assembly and disassembly.

11. An all-metal engine rear support system for supporting an engine within an outer housing and adapted to carry full engine torque load comprising pairs of link bars adapted to be located on opposite sides of the engine and with each of said link bars adapted to be pivotally attached at one end to the engine and with its other end pivotally attached at a second pivot point to the other link bar in its pair, two vertically extending main shock struts adapted to be pivotally attached to the outer housing and each pivotally attached to one of said pairs of link bars at said second pivot point such that as one of said struts is in tension due to engine torque load the other is in compression, each of said struts comprising a plurality of concentric resilient tubes, means connecting said tubes so that the effect of a single resilient tube of a length equal to the total length of all of said tubes is accomplished and further such that said tubes are alternately in tension or compression starting with either the outer or inner tube when said strut is in tension and such that each tube in tension changes to compression and each tube in compression changes to tension as said strut undergoes a tension to compression load change.

References Cited in the file of this patent

UNITED STATES PATENTS

| | | |
|---|---|---|
| 2,529,955 | Morley | Nov. 14, 1950 |
| 2,684,819 | Leggett | July 27, 1954 |
| 2,753,140 | Hasbrouck | July 3, 1956 |